United States Patent
Huke et al.

(10) Patent No.: US 11,361,627 B1
(45) Date of Patent: Jun. 14, 2022

(54) METHOD OF VERIFYING THAT A WAGER WAS PLACED BEFORE MARKET CLOSE

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/402,881

(22) Filed: Aug. 16, 2021

Related U.S. Application Data

(60) Provisional application No. 63/119,815, filed on Dec. 1, 2020.

(51) Int. Cl.
*G06F 16/00* (2019.01)
*G07F 17/32* (2006.01)
*G06F 16/23* (2019.01)
*G06Q 50/34* (2012.01)
*G06Q 20/02* (2012.01)

(52) U.S. Cl.
CPC ...... *G07F 17/3288* (2013.01); *G06F 16/2322* (2019.01); *G06Q 20/02* (2013.01); *G06Q 50/34* (2013.01); *G07F 17/323* (2013.01)

(58) Field of Classification Search
USPC .......................................................... 463/25
See application file for complete search history.

(56) References Cited

U.S. PATENT DOCUMENTS

| | | | |
|---|---|---|---|
| 2003/0003997 A1* | 1/2003 | Vuong | G07F 17/3239 463/42 |
| 2003/0064807 A1 | 4/2003 | Walker et al. | |
| 2007/0013133 A1 | 1/2007 | Novellie et al. | |
| 2012/0046096 A1 | 2/2012 | Morrison et al. | |
| 2012/0214575 A1 | 8/2012 | Amaitis et al. | |
| 2014/0094290 A1 | 4/2014 | Jabara | |

(Continued)

FOREIGN PATENT DOCUMENTS

| | | | |
|---|---|---|---|
| CN | 111770456 A | * | 10/2020 |
| JP | 2019118106 A | * | 7/2019 |

(Continued)

OTHER PUBLICATIONS

International Search Report and Written Opinion dated Apr. 7, 2022 in corresponding International Patent Application No. PCT/US2021/061345; 21 pages.

*Primary Examiner* — William E Rankins
(74) *Attorney, Agent, or Firm* — Maier & Maier, PLLC

(57) ABSTRACT

The present disclosure provides a method to determine if a user had placed a wager and verify that the wager was placed before the wagering market closed in a play-by-play wagering network. This method provides the ability to receive a wager from a user and allows the wagering network to receive a timestamp from the user's device to determine if the wager was placed before the market closing. Also, this method provides the ability to verify that there is no fraud, malicious activity, or cheating from the user by verifying that through a 3rd party network, such as the user's network connecting the user to the internet, that the timestamps provided by the network are correct and allowing the user to confirm their wager if received a few moments after the market has closed.

7 Claims, 5 Drawing Sheets

(56) References Cited

U.S. PATENT DOCUMENTS

Figure 1:
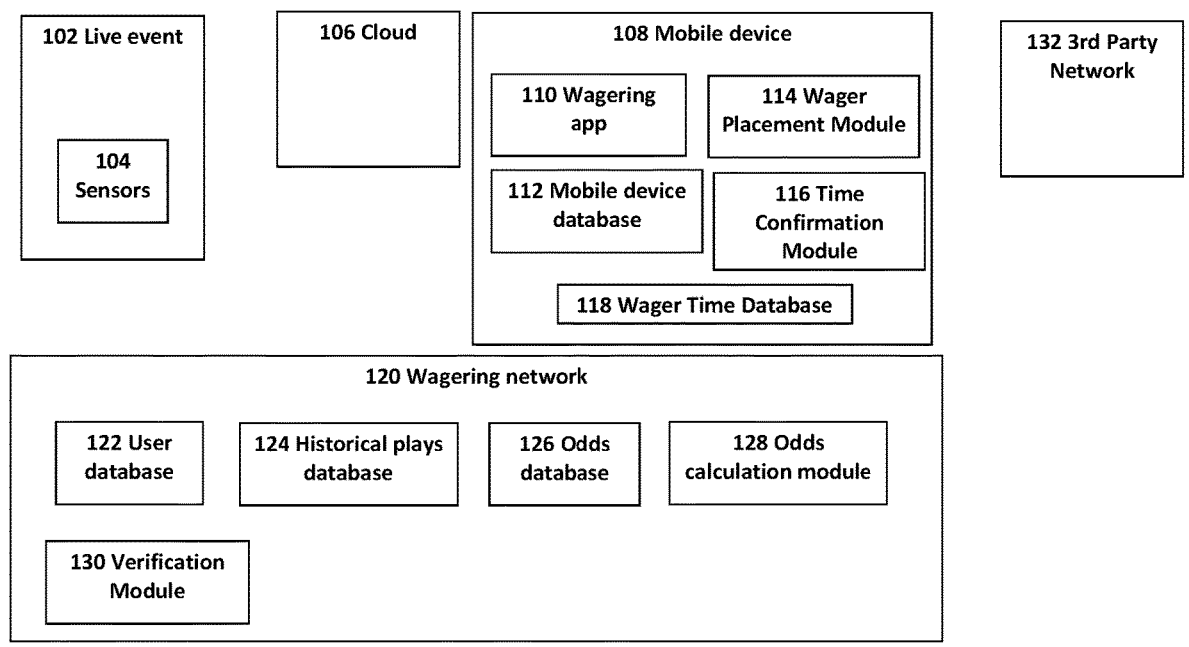

| | | |
|---|---|---|
| 2016/0125691 A1 | 5/2016 | Rangarajan et al. |
| 2017/0039808 A1 | 2/2017 | Arnone et al. |
| 2018/0077007 A1* | 3/2018 | Olson ................ G06F 11/2097 |
| 2020/0219364 A1 | 7/2020 | Czyzewski et al. |

FOREIGN PATENT DOCUMENTS

| | | |
|---|---|---|
| WO | 2007118300 A1 | 10/2007 |
| WO | 2008039402 A2 | 4/2008 |
| WO | 2015042600 A1 | 3/2015 |
| WO | 2016095015 A1 | 6/2016 |

* cited by examiner

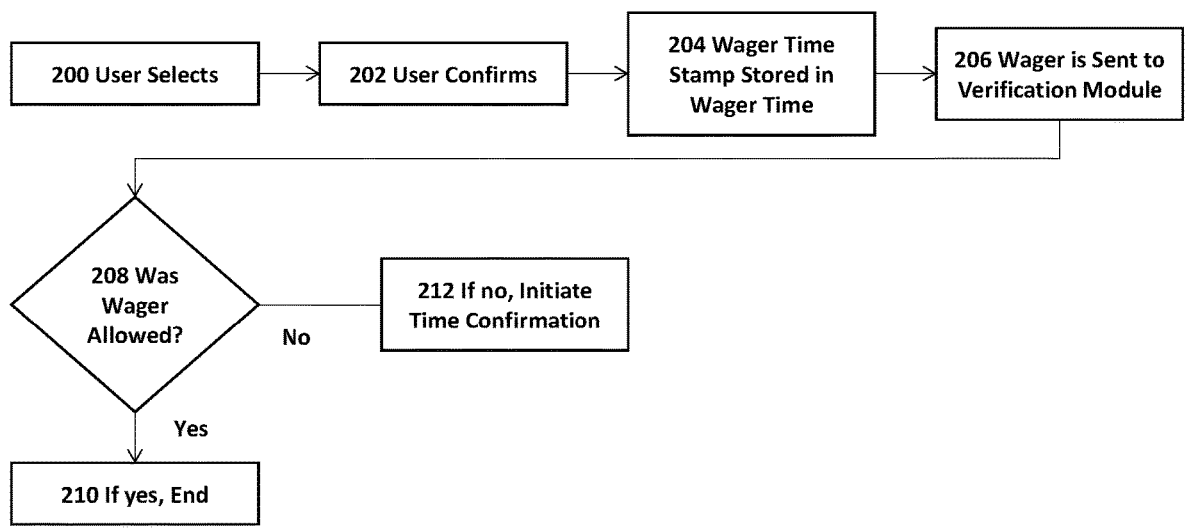
Fig.2 Wager Placement Module

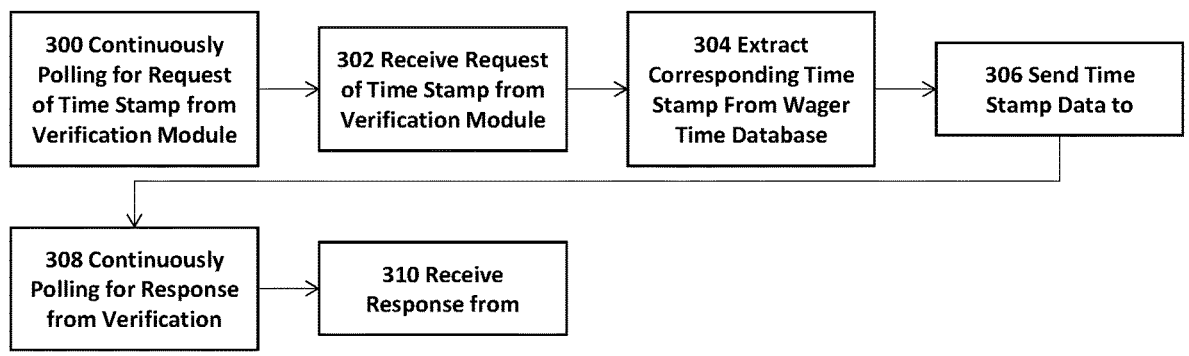
Fig.3 Time Confirmation Module

| Wager ID | Time Stamp | Screenshot of Time Stamp |
|---|---|---|
| #789456123 | 11:59:55am | #789456123.JPEG |
| #321654987 | 12:01:34pm | #321654987.JPEG |
| #456987321 | 12:05:15pm | #456987321.JPEG |
| - | - | - |
| - | - | - |
| - | - | - |

Fig.4 Wager Time Database

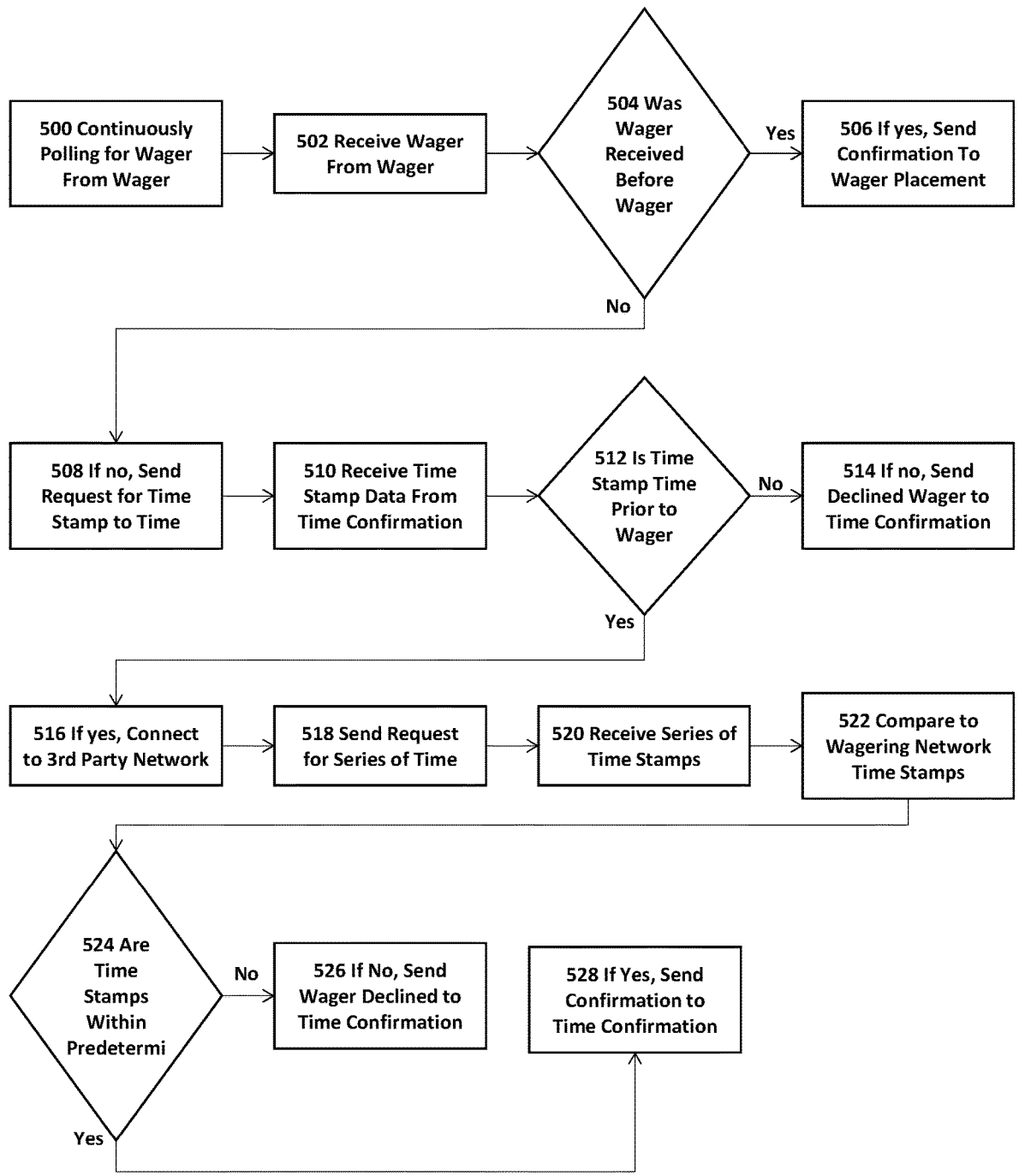
Fig.5 Verification Module

METHOD OF VERIFYING THAT A WAGER WAS PLACED BEFORE MARKET CLOSE

CROSS-REFERENCE TO RELATED APPLICATIONS

The present patent application claims benefit and priority to U.S. Provisional Patent Application No. 63/119,815 filed on Dec. 1, 2020, which is hereby incorporated by reference into the present disclosure.

FIELD

The present disclosures are generally related to play-by-play wagering on live sporting events.

BACKGROUND

Currently, on wagering networks, the user experience may be interrupted due to loss of a signal, cellular data, Wi-Fi, other networking capabilities, etc. while the user is trying to place a wager which may cause frustration for the user if they have placed a wager.

Also, users' connections may drop immediately after the wager has been placed, leaving the user confused about why their wager was not placed.

Lastly, there is currently no way to determine if the user had placed a wager or tried to place a wager, and loss a connection to a wagering network at the moment of connection loss, leaving the wagering network with a loss in potential action.

Thus, there is a need in the prior art to determine if the user had lost connection and did place a wager before the market for the wager was closed.

SUMMARY

Methods, systems and apparatuses for verifying that timing and placement of a wager may be shown and described. In one embodiment, a method for verifying placement of wagers before a market closes on a sport wagering network can include receiving at least one wager from a which includes a wager timestamp of when the wager was placed; storing the wager timestamp of the wager in a wager time database; verifying the placement of the wager by determining if the wager timestamp of the wager was before the time associated with a close of the wager market; and verifying the validity of the wager timestamp of the wager by connecting to a third-party network, comparing at least one third-party network timestamp with at least one wager timestamp stored in the wager time database, and determining if the at least one third-party network timestamp and at least one wager timestamp are within a predetermined margin of error.

In another embodiment, a system for verifying placement of wagers before a market closes on a sport wagering network can include a wager placement module; a wager time database; a verification module; a time confirmation module; and a device configured to display a notification regarding a status of a placed wager, where the wager placement module is configured to receive a wager placed by a user, store the wager in a wager time database and send the wager to a verification module and a time confirmation module, the time confirmation module is configured to poll for a request of a wager timestamp from the verification module, receive the request, extract the corresponding wager timestamp from the wager time database, send the wager timestamp data to the verification module, poll for a response from the verification module, and receive a response from the verification module, the wager time database is configured to house at least a wager ID, a wager timestamp, and a screenshot of the wager timestamp; the verification module is configured to determine if the wager of the user was received before the closing time of the wager market, determine if the wager timestamp was prior to the close of the wager market, connect to a third-party network to send and receive at least one series of timestamps, compare the timestamps received, and confirm or decline the wager based on if the timestamps fall within a predetermined margin of error.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for verifying that a wager was placed before market close on a play-by-play wagering network, according to an embodiment.

FIG. 2: illustrates a wager placement module, according to an embodiment.

FIG. 3: illustrates a time confirmation module, according to an embodiment.

FIG. 4: illustrates a wager time database, according to an embodiment.

FIG. 5: illustrates a verification module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that specific circuits can perform the various sequence of actions described herein (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or other type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for certain amount or for a future time. A "bet" or "wager" can be made for being able to answer a question correctly. A "bet" or "wager" can be made within a certain period. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain to place bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that will be determined by a point spread or money line. The term "straight-up" means winning the game without any regard to the "point spread," a "money-line" bet. "Money line," "straight bet," and "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread." A handicap of the "point spread" value is given to the favorite team so bettors can choose sides at equal odds. "Cover the spread" means that a favorite wins an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay," "round robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers scheduled to start a game start. If they do not, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management service are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land based on property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are services that help customers with (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat players to free bets, odds boosts, enhanced access, and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by always managing commission and availability. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth by creating and delivering actionable insights on performance to help customers to manage the sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for verifying that wager was placed before market close on a play-by-play wagering network. This system may include a live event 102, for example, a sporting event such as a football, basketball, baseball, or hockey game, tennis match, golf tournament, eSports, or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the Internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 120 to place bets and provide payment/receive funds based on wager outcomes.

Further, embodiments may include a mobile device database 112 that may store some or all the user's data, the live event 102, or the user's interaction with the wagering network 120.

Further, embodiments may include a wager placement module 114, which may begin with the user selecting a wager on the wagering app 110. For example, the user may select that the first pitch of the Boston Red Sox vs. New York Yankees will be a strike at 11:59:55 am. Then the user may confirm a wager on the wagering app 110. For example, the user may confirm the wager of the first pitch of the Boston Red Sox vs. New York Yankees will be a strike at 11:59:55 am. Then the wager placement module 114 may store the wager time stamp in the wager time database 118. For example, the wager ID number, such as #789456123, the time, such as 11:59:55 am, and a screenshot of the confirmed wager stored as a JPEG file, such as #789456123.JPEG. The wager placement module 114 may send the wager to the verification module 130. For example, the wager that the first pitch of the Boston Red Sox vs. New York Yankees will be a strike may be sent to the verification module 130. Then the wager placement module 114 may determine if the wager was allowed. For example, the wager placement module 114 may receive a confirmation from the verification module 130 if the wager is accepted, or the wager placement module 114 may receive a notice that the wager has been declined or that more data is needed to confirm the wager. If the wager was accepted or confirmed by the verification module 1330, then the process ends. For example, the wager placement module 114 may receive a confirmation from the verification module 130 if the wager is accepted. If the wager was not accepted by the verification module 130, then the wager placement module 114 may initiate the time confirmation module 116. For example, the wager placement module 114 may receive a notice that the wager has been declined or that more data is needed to confirm the wager in which the wager placement module 114 may initiate the time confirmation module 116.

Further, embodiments may include a time confirmation module 116, which may begin with the time confirmation module 116 continuously polling for a request from the verification module 130 for the timestamp of the wager. For example, if the wager is declined or more data is needed to confirm the wager, the verification module 130 may send a request for the data stored in the time wager database 118. Then the time confirmation module 116 may receive a request for the time stamp from the verification module 130. In some embodiments, the verification module 130 may send the wager ID to receive the correct wager timestamp data from the time confirmation module 116. The time confirmation module 116 may extract the time stamp from the wager time database 118. For example, the time confirmation module 116 may extract the wager ID, the time stamp, and the screenshot of the wager confirmation from the wager time database 118. Then the time confirmation module 116 may send the time stamp data to the verification module 130. For example, the time confirmation module 116 may send the wager ID, such as #789456123, the time stamp, such as 11:59:55 am, and the screenshot of the wager confirmation in a JPEG file, such as #789456123.JPEG. Then the time confirmation module 116 may continuously poll for a response from the verification module 130. For example, the time confirmation module 116 is polling for the verification module 130 to either confirm or accept the wager or decline or cancel the wager. Then the time confirmation module 116 may receive a response from the verification module 130. For example, the time confirmation module 116 may receive that the wager is confirmed or accepted or declined or canceled.

Further, embodiments may include a wager time database 118, which may contain the wager ID, such as #789456123, the time stamp, such as 11:59:55 am, and the screenshot of the wager confirmation in a JPEG file, such as #789456123.JPEG. This database may be created from the process described in the wager placement module 114, which may take a screenshot of the wager once confirmed and stores the data in the wager time database 118. In some embodiments, the screenshot may be stored as a picture, image, photo, or some other visual data that displays the user device's screen to show the time in which the wager was confirmed.

Further, embodiments may include the wagering network 120, which may perform real-time analysis on the type of play and the result of a play or action. The wagering network 120 (or the cloud 106) may also be synchronized with game situational data, such as the time of the game, the score, location on the field, weather conditions, and the like, which may affect the choice of play utilized. For example, in an exemplary embodiment, the wagering network 120 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 120 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 122, which may contain data relevant to all users of the wagering network 120 and may include, but is not limited to, a user ID, a device identifier, a paired device identifier, wagering history, or wallet information for the user. The user database 122 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 122 may contain betting lines and search queries. The user database 122 may be searched based on a search criterion received from the user. Each betting line may include, but is not limited to, a plurality of betting attributes such as at least one of the live event 102, a team, a player, an amount of wager, etc. The user database 122 may include but is not limited to information related to all the users involved in the live event 102. In one exemplary embodiment, the user database 122 may include information for generating a user authenticity report and a wagering verification report. Further, the user database 122 may be used to store user statistics like, but not limited to, the retention period for a particular user, frequency of wagers placed by a particular user, the average amount of wager placed by each user, etc.

Further, embodiments may include a historical plays database 124 that may contain play data for the type of sport being played in the live event 102. For example, in American Football, for optimal odds calculation, the historical play data may include metadata about the historical plays, such as time, location, weather, previous plays, opponent, physiological data, etc. Further, embodiments may utilize an odds database 126—that may contain the odds calculated by an odds calculation module 128—to display the odds on the user's mobile device 108 and take bets from the user through the mobile device wagering app 110.

Further, embodiments may include the odds calculation module 128, which utilizes historical play data to calculate odds for in-play wagers.

Further, embodiments may include a verification module 130, which may begin with the verification module 130 continuously polling for a wager from the wager placement module 114. Then the verification module 130 may receive the wager from the wager placement module 116. Then the verification module 130 may determine if the wager was received before the wager window has closed. For example, the verification module 130 may determine if the time in which the wager was received was before the wager closing, for example, the wager window closing at 12:00:00 pm. If the wager was received before the wager window closed, the verification module may send a confirmation to the wager placement module 116. For example, the wager window closed at 12:00:00 pm, but the wager was received before 12:00:00 pm. If the wager was not received before the wager window closed, then the verification module 130 may send a request for the wager timestamp data to the time confirmation module 116. For example, if the wager was received at 12:00:10 pm and the wager window closed at 12:00:00 pm, the verification module 130 may send a request for wager timestamp data. Then the verification module 130 may receive the time stamp data from the time confirmation module 116. For example, the verification module 130 may receive the wager ID, such as #789456123, the time stamp, such as 11:59:55 am, and the screenshot of the wager confirmation in a JPEG file such as #789456123.JPEG from the time confirmation module 116. The verification module 130 may determine if the time stamp data time is before the wager window closes. For example, the wager window closed at 12:00:00 pm, but the time stamp data for the wager was 11:59:55 am. If the time stamp data time is after the wager window closing, then the verification module 130 may send wager declined to the time confirmation module 116. For example, if the wager timestamp data was for 12:00:10 pm and the wager window closed at 12:00:00, the wager may be declined. If the time stamp data time is before the wager window closing, then the verification module 130 may connect to the 3rd party network 132. For example, the wager window closed at 12:00:00 pm, but the time stamp data for the wager was 11:59:55 am the verification module 130 may connect to the 3rd party network 132. Then the verification module 130 may send a request for a series of timestamps to the 3rd party network 132. For example, the verification module 130 may request when the user data was received to confirm the wager was sent to the 3rd party network; also, the verification module 130 may request the 3rd party network 132 to send timestamps or pings of timestamps at different times so that the verification module has various time stamps from the 3rd party network 132. The verification module 130 may receive a series of timestamps from the 3rd party network 132. For example, the verification module 130 may request when the user data was received to confirm the wager was sent to the 3rd party network; also, the verification module 130 may request the 3rd party network 132 to send timestamps or pings of timestamps at different times so that the verification module has various time stamps from the 3rd party network 132. Then the verification module 130 may compare the wagering network 120 to the received timestamps from the 3rd party network 132. For example, the verification module 130 may receive time stamps or pings of timestamps at different times from the 3rd party network 132 and may compare them to the time that the wager network 120 has when the timestamps are received so that the verification module 130 can determine if the 3rd party network 132 timestamps are correct or if they have been altered in any fashion. For example, if the 3rd party network 132 sends a timestamp of 12:00:00 pm and the time for the wagering network 120 is 12:00:05 pm, then the 5-second discrepancy may be due to a latency issue. However, if the 3rd party network 132 sends a timestamp of 11:00:00 am, and the time for the wagering network 120 is 12:00:05 pm, then the time stamps for the 3rd party network 132 have been altered in some fashion. The verification module 130 may determine if the timestamps are within a predetermined margin of error, for example, within 10 seconds. For example, if the 3rd party network 132 sends a timestamp of 12:00:00 pm and the time for the wagering network 120 is 12:00:05 pm, this may fall into the 10-second predetermined margin of error, and the discrepancy may be due to a latency or disconnection issue. However, if the 3rd party network 132 sends a timestamp of 11:00:00 am, and the time for the wagering network 120 is 12:00:05 pm, then this may be above the predetermined margin of error, and the wager may be declined or canceled. If the timestamps are not within the predetermined margin of error, then the verification module may send that the wager was declined to the time confirmation module 116. If the time stamps were within the predetermined margin of error, then the verification module 130 may send a wager confirmation to the time confirmation module 116.

Further, embodiments may include a 3rd party network 132 used by the mobile device 108 to connect to the wagering network 120 to place wagers. The 3rd party network 132 may be a wired and/or a wireless network. The 3rd party network 132, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The 3rd party network 132 may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance.

FIG. 2 illustrates the wager placement module 114. The process may begin with the user selecting, at step 200, a wager on the wagering app 110. For example, the user may select that the first pitch of the Boston Red Sox vs. New York Yankees will be a strike at 11:59:55 am. Then the user may confirm, at step 202, a wager on the wagering app 110. For example, the user may confirm the wager of the first pitch of the Boston Red Sox vs. New York Yankees will be a strike at 11:59:55 am. Then the wager placement module 114 may store the wager time stamp, at step 204, in the wager time database 118. For example, the wager ID number, such as #789456123, the time, such as 11:59:55 am, and a screenshot of the confirmed wager stored as a JPEG file, such as #789456123.JPEG. The wager placement module 114 may send, at step 206, the wager to the verification module 130. For example, the wager that the first pitch of the Boston Red Sox vs. New York Yankees will be a strike may be sent to the verification module 130. Then the wager placement module 114 may determine, at step 208, if the wager was allowed. For example, the wager placement module 114 may receive a confirmation from the verification module 130 if the wager is accepted, or the wager placement module 114 may receive a notice that the wager has been declined or that more data is needed to confirm the wager. If the wager was accepted or confirmed by the verification module 130, then the process may end at step 210. For example, the wager placement module 114 may receive a confirmation from the verification module 130 if the wager is accepted. If the wager was not accepted by the verification module 130, then the wager placement module 114 may initiate, at step 212, the time confirmation module 116. For example, the wager placement module 114 may receive a notice that the wager has been declined or that more data is needed to confirm the wager in which the wager placement module 114 may initiate the time confirmation module 116.

FIG. 3 illustrates the time confirmation module 116. The process may begin with the time confirmation module 116 continuously polling, at step 300, for a request from the verification module 130 for the timestamp of the wager. For example, if the wager is declined or more data is needed to confirm the wager, the verification module 130 may send a request for the data stored in the time wager database 118. Then the time confirmation module 116 may receive, at step 302, a request for the time stamp from the verification module 130. For example, if the wager is declined or more data is needed to confirm the wager, the verification module 130 may send a request for the data stored in the time wager database 118. In some embodiments, the verification module 130 may send the wager ID to receive the correct wager timestamp data from the time confirmation module 116. The time confirmation module 116 may extract, at step 304, the time stamp from the wager time database 118. For example, the time confirmation module 116 may extract the wager ID, the time stamp, and the screenshot of the wager confirmation from the wager time database 118. Then the time confirmation module 116 may send, at step 306, the time stamp data to the verification module 130. For example, the time confirmation module 116 may send the wager ID, such as #789456123, the time stamp, such as 11:59:55 am, and the screenshot of the wager confirmation in a JPEG file, such as #789456123.JPEG. Then the time confirmation module 116 may continuously poll, at step 308, for a response from the verification module 130. For example, the time confirmation module 116 is polling for the verification module 130 to either confirm or accept the wager or decline or cancel the wager. Then the time confirmation module 116 may receive, at step 310, a response from the verification module 130. For example, the time confirmation module 116 may receive that the wager is confirmed, accepted, declined, or canceled.

FIG. 4 illustrates the wager time database 118. The database may contain the wager ID, such as #789456123, the time stamp, such as 11:59:55 am, and the screenshot of the wager confirmation in a JPEG file, such as #789456123.JPEG. This database may be created from the process described in the wager placement module 114, which may take a screenshot of the wager once confirmed and stores the data in the wager time database 118. In some embodiments, the screenshot may be stored as a picture, image, photo, or some other visual data that displays the user device's screen to show the time in which the wager was confirmed.

FIG. 5 illustrates the verification module 130. The process may begin with the verification module 130 continuously polling, at step 500, for a wager from the wager placement module 114. For example, the verification module 130 may poll for a wager the user has confirmed, such as the first pitch of the Boston Red Sox vs. New York Yankees will be a strike at 11:59:55 am. Then the verification module 130 may receive, at step 502, the wager from the wager placement module 116. For example, the verification module 130 may receive a wager the user has confirmed, such as the first pitch of the Boston Red Sox vs. New York Yankees will be a strike at 11:59:55 am. Then the verification module 130 may determine, at step 504, if the wager was received before the wager window has closed. For example, the verification module 130 may determine if the time in which the wager was received was before the wager closing, for example, the wager window closing at 12:00:00 pm. If the wager was received before the wager window closed, the verification module may send, at step 506, a confirmation to the wager placement module 116. For example, the wager window closed at 12:00:00 pm, but the wager was received before 12:00:00 pm. If the wager was not received before the wager window closed, then the verification module 130 may send, at step 508, a request for the wager timestamp data to the time confirmation module 116. For example, if the wager was received at 12:00:10 pm and the wager window closed at 12:00:00 pm, the verification module 130 may send a request for wager timestamp data. Then the verification module 130 may receive, at step 510, the time stamp data from the time confirmation module 116. For example, the verification module 130 may receive the wager ID, such as #789456123, the time stamp, such as 11:59:55 am, and the screenshot of the wager confirmation in a JPEG file such as #789456123.JPEG from the time confirmation module 116. The verification module 130 may determine, at step 512, if the wager timestamp data time is before the wager window closing. For example, the wager window closed at 12:00:00 pm, but the time stamp data for the wager was 11:59:55 am. If the time stamp data time is after the wager window closing, then the verification module 130 may send, at step 514, that the wager was declined to the time confirmation module 116. For example, if the wager timestamp data was for 12:00:10 pm and the wager window closed at 12:00:00, the wager may be declined. If the time stamp data time is before the wager window closing, then the verification module 130 may connect, at step 516, to the 3rd party network 132. For example, the wager window closed at 12:00:00 pm, but the time stamp data for the wager was 11:59:55 am the verification module 130 may connect to the 3rd party network 132. Then the verification module 130 may send, at step 518, a request for a series of timestamps to the 3rd party network 132. For example, the verification module 130 may request when the user data to confirm the wager was sent to the 3rd party network; also, the verification module 130 may request the 3rd party network 132 to send timestamps or pings of timestamps at different times so that the verification module has various time stamps from the 3rd party network 132. The verification module 130 may receive, at step 520, a series of timestamps from the 3rd party network 132. For example, the verification module 130 may request when the user data to confirm the wager was sent to the 3rd party network; also, the verification module 130 may request the 3rd party network 132 to send timestamps or pings of timestamps at different times so that the verification module has various time stamps from the 3rd party network 132. Then the verification module 130 may compare, at step 522, the wagering network 120 to the received timestamps from the 3rd party network 132. For example, the verification module 130 may receive time stamps or pings of timestamps at different times from the 3rd party network 132 and may compare them to the time that the wager network 120 has when the timestamps are received so that the verification module 130 can determine if the 3rd party network 132 timestamps are correct or if they have been altered in any fashion. For example, if the 3rd party network 132 may send a timestamp of 12:00:00 pm and the time for the wagering network 120 is 12:00:05 pm, then the 5-second discrepancy may be due to a latency issue. However, if the 3rd party network 132 sends a timestamp of 11:00:00 am, and the time for the wagering network 120 is 12:00:05 pm, then the time stamps for the 3rd party network 132 have been altered in some fashion. The verification module 130 may determine, at step 524, if the timestamps are within a predetermined margin of error, for example, within 10 seconds. For example, if the 3rd party network 132 sends a timestamp to the verification module 130 at 12:00:00 pm and the time for the wagering network 120 is 12:00:05 pm, this may fall into the 10-second predetermined margin of error, and the discrepancy may be due to a latency or disconnection issue. However, if the 3rd party network 132 may send a timestamp of 11:00:00 am, and the time for the wagering network 120 is 12:00:05 pm, this may be above the predetermined margin of error, and the wager may be declined or canceled. If the timestamps are not within the predetermined margin of error, then the verification module may send, at step 526, that the wager was declined to the time confirmation module 116. If the timestamps were within the predetermined margin of error, then the verification module 130 may send, at step 528, a wager confirmation to the time confirmation module 116.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for verifying placement of wagers before a market closes on a sport wagering network, comprising:
   receiving at least one wager which includes a wager timestamp of when the wager was placed;
   storing the wager timestamp of the wager in a wager time database; and
   verifying the placement of the wager by determining if the wager timestamp of the wager was before the time associated with a close of the wager market; and
   verifying the validity of the wager timestamp of the wager by connecting to a third-party network, comparing at least one third-party network timestamp with at least one wager timestamp stored in the wager time database, and determining if the at least one third-party network timestamp and at least one wager timestamp are within a predetermined margin of error.

2. The method for verifying placement of wagers before a market closes on a sport wagering network of claim 1, wherein the predetermined margin of error further comprises a time value less than 10 seconds.

3. The method for verifying placement of wagers before a market closes on a sport wagering network of claim 1, further comprising utilizing a notification to inform the user of the status of the wager.

4. The method for verifying placement of wagers before a market closes on a sport wagering network of claim 1, further comprising accepting the placement of the wager if the timestamps are within the predetermined margin of error.

5. The method for verifying placement of wagers before a market closes on a sport wagering network of claim 1, further comprising displaying a message that the wager was accepted, confirmed, rejected, or cancelled to the user.

6. A system for verifying placement of wagers before a market closes on a sport wagering network, comprising:
   a wager placement module;
   a wager time database;
   a verification module;
   a time confirmation module; and
   a device configured to display a notification regarding a status of a placed wager, wherein
   the wager placement module is configured to receive a wager placed by a user, store the wager in a wager time database and send the wager to a verification module and a time confirmation module,
   the time confirmation module is configured to poll for a request of a wager timestamp from the verification module, receive the request, extract the corresponding wager timestamp from the wager time database, send the wager timestamp data to the verification module, poll for a response from the verification module, and receive a response from the verification module,
   the wager time database is configured to house at least a wager ID, a wager timestamp, and a screenshot of the wager timestamp;
   the verification module is configured to determine if the wager of the user was received before the closing time of the wager market, determine if the wager timestamp was prior to the close of the wager market, connect to a third-party network to send and receive at least one series of timestamps, compare the timestamps received, and confirm or decline the wager based on if the timestamps fall within a predetermined margin of error.

7. The system for verifying placement of wagers before a market closes on a sport wagering network of claim 6, wherein the screenshot of the wager timestamp is a picture, image, or photo.

* * * * *